Aug. 6, 1935.  E. KLUCK ET AL  2,010,458
SOIL CONDITIONING MACHINE
Filed Feb. 26, 1935  3 Sheets-Sheet 1

Inventors
Edward Kluck
Alex Genzman
By Clarence A. O'Brien
Attorney

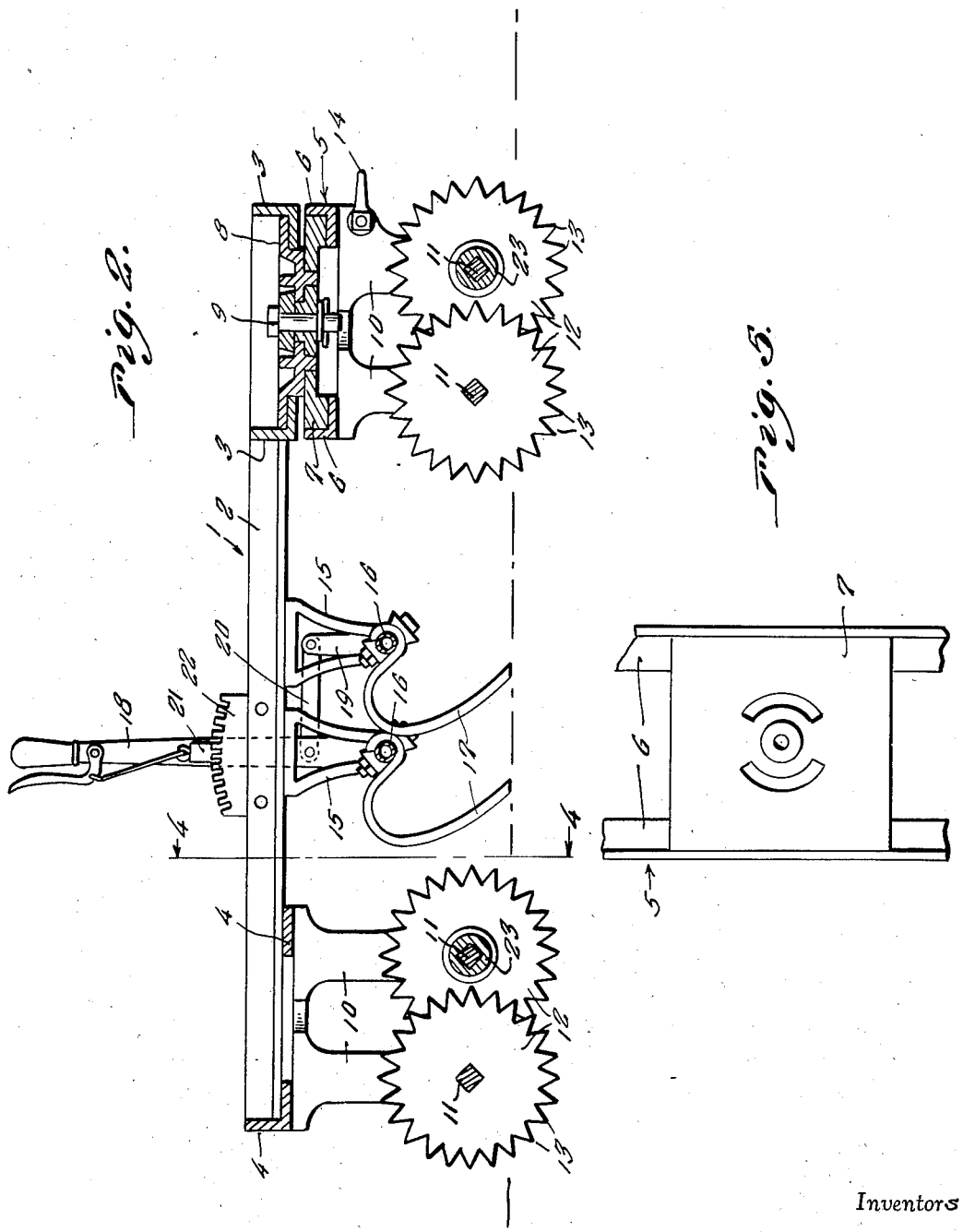

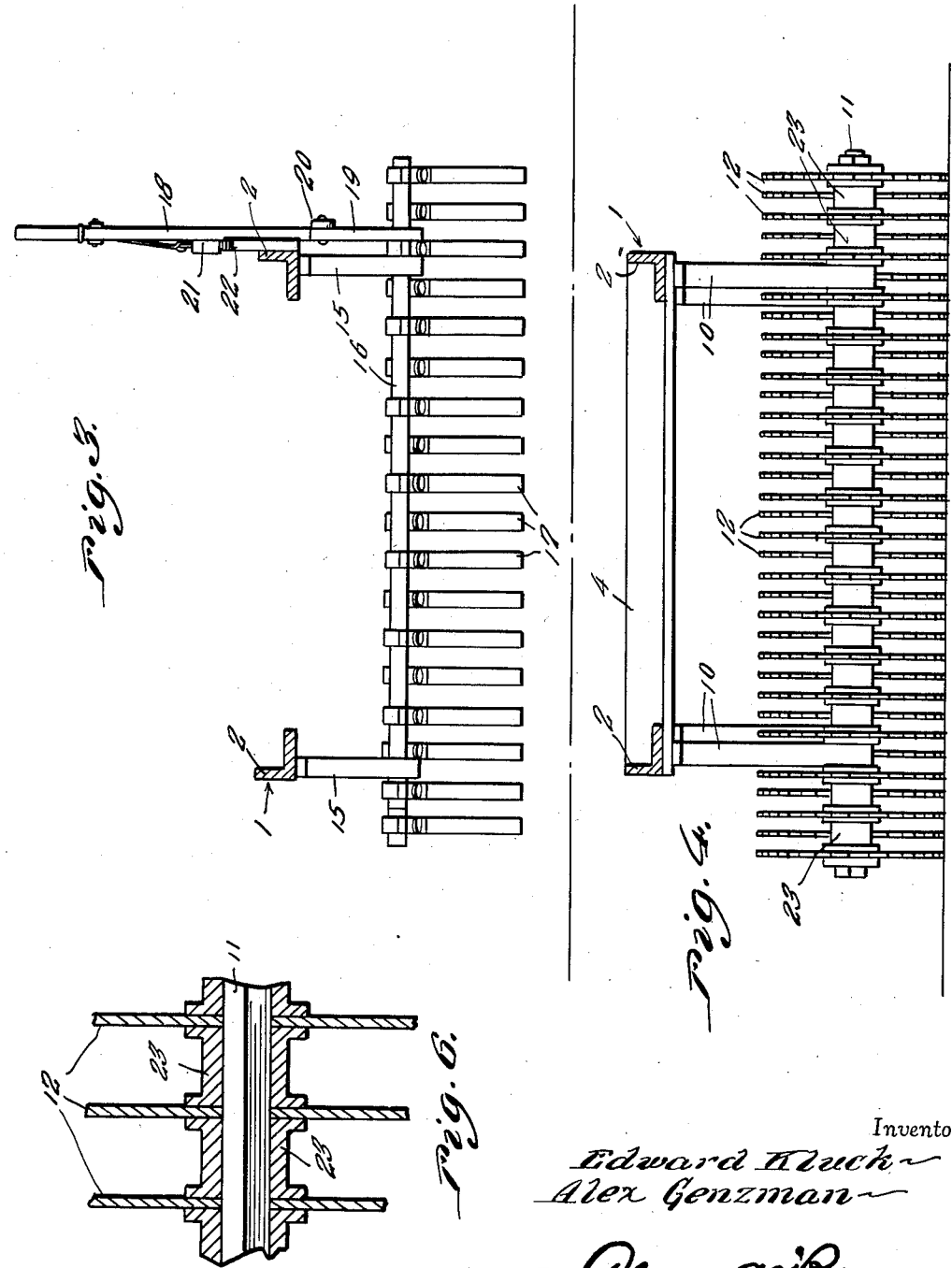

Patented Aug. 6, 1935

2,010,458

UNITED STATES PATENT OFFICE 2,010,458

SOIL CONDITIONING MACHINE

Edward Kluck and Alex Genzman,
Rocky Ridge, Ohio

Application February 26, 1935, Serial No. 8,355

2 Claims. (Cl. 55—30)

The present invention relates to new and useful improvements in soil conditioning machines and has for its primary object to provide, in a manner as hereinafter set forth, an apparatus of this character embodying a novel construction, combination and arrangement of parts through the medium of which the soil may be loosened, pulverized, levelled, and otherwise thoroughly conditioned for plowing in a single treatment, thus rendering it necessary to pass the machine but once thereover.

Another important object of the invention is to provide a machine of the aforementioned character comprising a plurality of series of resilient clod lifting teeth, together with novel means through the medium of which said teeth may be expeditiously adjusted or regulated to penetrate the ground to the desired depth.

Another important object of the invention is to provide a soil conditioning machine of the character described which includes series of staggered rotary disks or knives having cutting teeth on the periphery thereof for cutting the soil.

Other objects of the invention are to provide a soil conditioning machine of the character set forth which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 2 is a vertical longitudinal section through the machine.

Figure 3 is a view in vertical transverse section through the machine, taken substantially on the line 3—3 of Figure 1.

Figure 4 is a view in vertical transverse section, taken substantially on the line 4—4 of Figure 2.

Figure 5 is a detail view in top plan of the fifth wheel.

Figure 6 is a fragmentary view in vertical section, showing the mounting of the cutting knives or disks on their axles.

Figure 1:
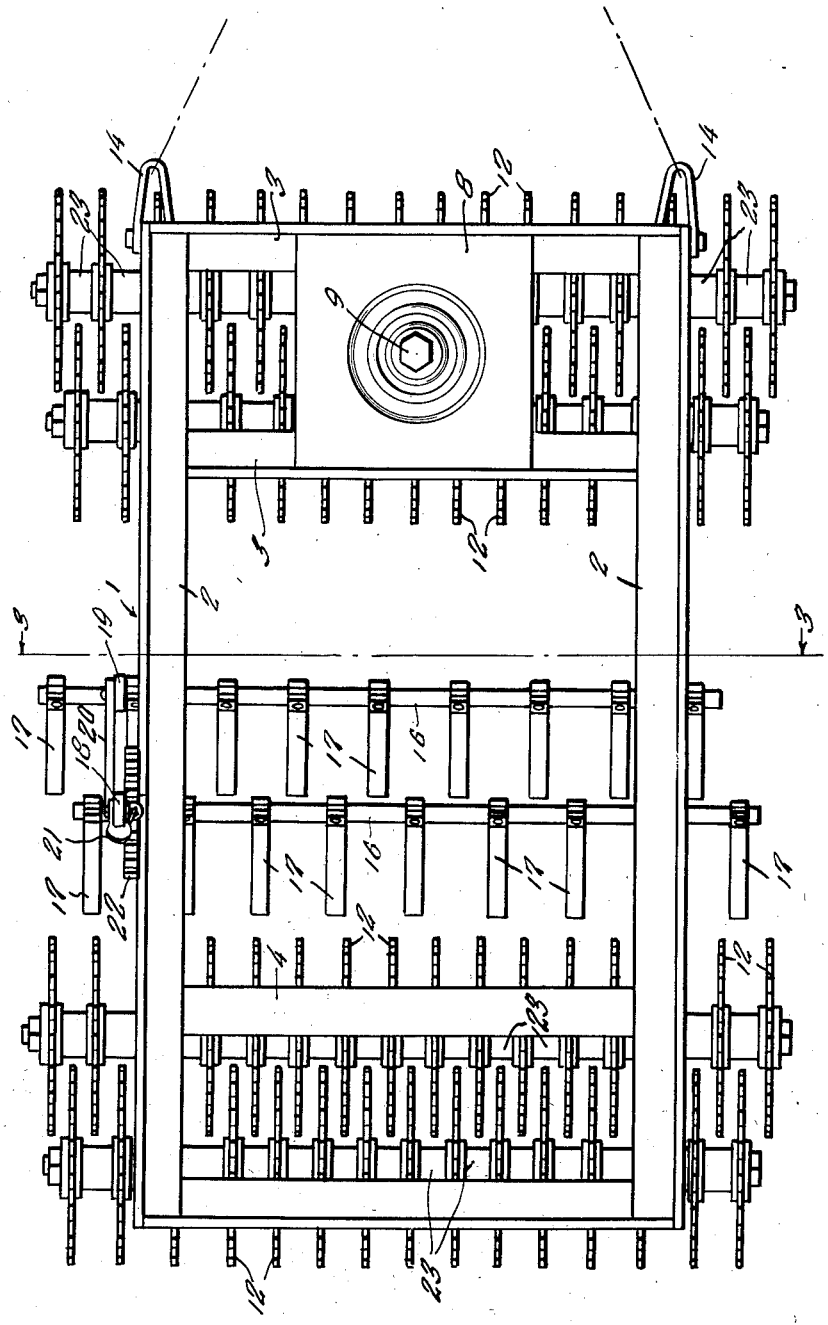
Figure 1 is a view in top plan of a soil conditioning machine constructed in accordance with the present invention.

Referring now to the drawings in detail, it will be seen that the embodiment of the invention which has been illustrated comprises a frame which is designated generally by the reference numeral 1, said frame including a pair of longitudinal side members 2 of angle iron, a pair of front cross members 3, also of angle iron, and a pair of rear cross members 4, the rearmost of which is of angle iron, as illustrated to advantage in Figure 2 of the drawings.

Mounted for swinging movement in a horizontal plane beneath the forward end portion of the frame 1 is a bolster which is designated generally by the reference numeral 5. The bolster 5 comprises a pair of spaced, parallel bars 6 of angle iron between which a plate constituting a fifth wheel 7 is mounted. The fifth wheel 7 bears against a plate 8 which is mounted between the front cross members 3 of the frame 1, a kingpin 9 being provided for rotatably mounting the bolster 5 on said plate 8.

Pairs of hangers 10 depend from the bolster 5 and the rear cross members 4 and journaled in the lower end portions of said hangers are axles 11 of polygonal cross section having fixed thereon spaced, staggered rotary cutting disks or knives 12. The cutting disks or knives 12 include beveled cutting teeth 13. Clevices 14 are pivotally mounted on the front hangers 10 for connecting the machine to a suitable source of power.

Pairs of hangers 15 depend from an intermediate portion of the frame 1 and journaled in said hangers 15 are transverse shafts 16 having mounted thereon resilient teeth 17 which are preferably of substantially the shape shown to advantage in Figure 2 of the drawings. Fixed on one end portion of one of the shafts 16 is a hand lever 18 for adjusting the teeth 17. The other shaft 16 is operatively connected to the lever 18 through the medium of an arm 19 fixed on one end portion of said other shaft and a link 20 pivotally connected, at one end, to said arm and at its other to an intermediate portion of said lever 18. The lever 18 is releasably secured in adjusted position through the medium of a suitable latch 21 which is mounted thereon and which is engageable with a toothed plate 22 on the adjacent side of the frame 1.

In use, the machine may be weighted as may be necessary or desired. The beveled teeth 13 of the disks 12 cut or slice and puncture the clods which are encountered. As the machine passes over the ground the two front series of disks 12 cut or slice and puncture the clods, the resilient teeth 17 then bring the clods from the sub-soil to the surface which are treated by the two following rear series of disks, thus completing the conditioning operation. As illustrated to advantage in Figure 6 of the drawings, spacers 23 are provided on the axles 11 between the cutting disks or knives 12.

It is believed that the many advantages of a soil conditioning machine constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A soil conditioning machine of the class described comprising, in combination, a frame, a bolster pivotally mounted for swinging movement in a horizontal plane beneath the forward end portion of said frame, pairs of hangers depending from said bolster, transverse axles journaled in the hangers, relatively staggered series of toothed cutting disks fixed on said axles, spacers mounted on the axles between the cutting disks, pairs of hangers extending from the rear end portion of the frame, axles journaled in the second named hangers, toothed relativelf staggered cutting disks fixed on the second named axles, spacers between the second named cutting disks, pairs of hangers depending from an intermediate portion of the frame, shafts journaled in the last named hangers, resilient teeth fixed on said shafts, and means for adjusting the teeth, said means including a lever fixed on one of the shafts, an arm fixed on the other of said shafts, a link operatively connecting the arms to the lever, and means for securing said lever in adjusted position.

2. A soil conditioning machine of the class described comprising a frame, said frame including side members and further including pairs of front and rear cross members, a bearing plate mounted between the front cross members, a bolster mounted for swinging movement in a horizontal plane beneath the forward end portion of the frame, said bolster including a pair of spaced, parallel bars, a fifth wheel mounted between said bars and engaged with the plate, means pivotally connecting the fifth wheel to the plate, pairs of hangers depending from the bolster and from the rear cross members, toothed cutting disks rotatably mounted between the hangers, resilient teeth mounted on the frame at an intermediate point, and means for adjusting said teeth.

EDWARD KLUCK.
ALEX GENZMAN.